Sept. 30, 1969  N. L. OATES  3,469,278
FISH BEHEADING AND CLEANING MACHINE
Filed Nov. 10, 1965  15 Sheets-Sheet 1

INVENTOR.
NORFORD L. OATES
BY
Robert W. Beach
ATTORNEY

Sept. 30, 1969

N. L. OATES 3,469,278

FISH BEHEADING AND CLEANING MACHINE

Filed Nov. 10, 1965

INVENTOR.
NORFORD L. OATES

BY

ATTORNEY

INVENTOR.
NORFORD L. OATES
BY
Robert W. Beach
ATTORNEY

INVENTOR.
NORFORD L. OATES
BY
ATTORNEY

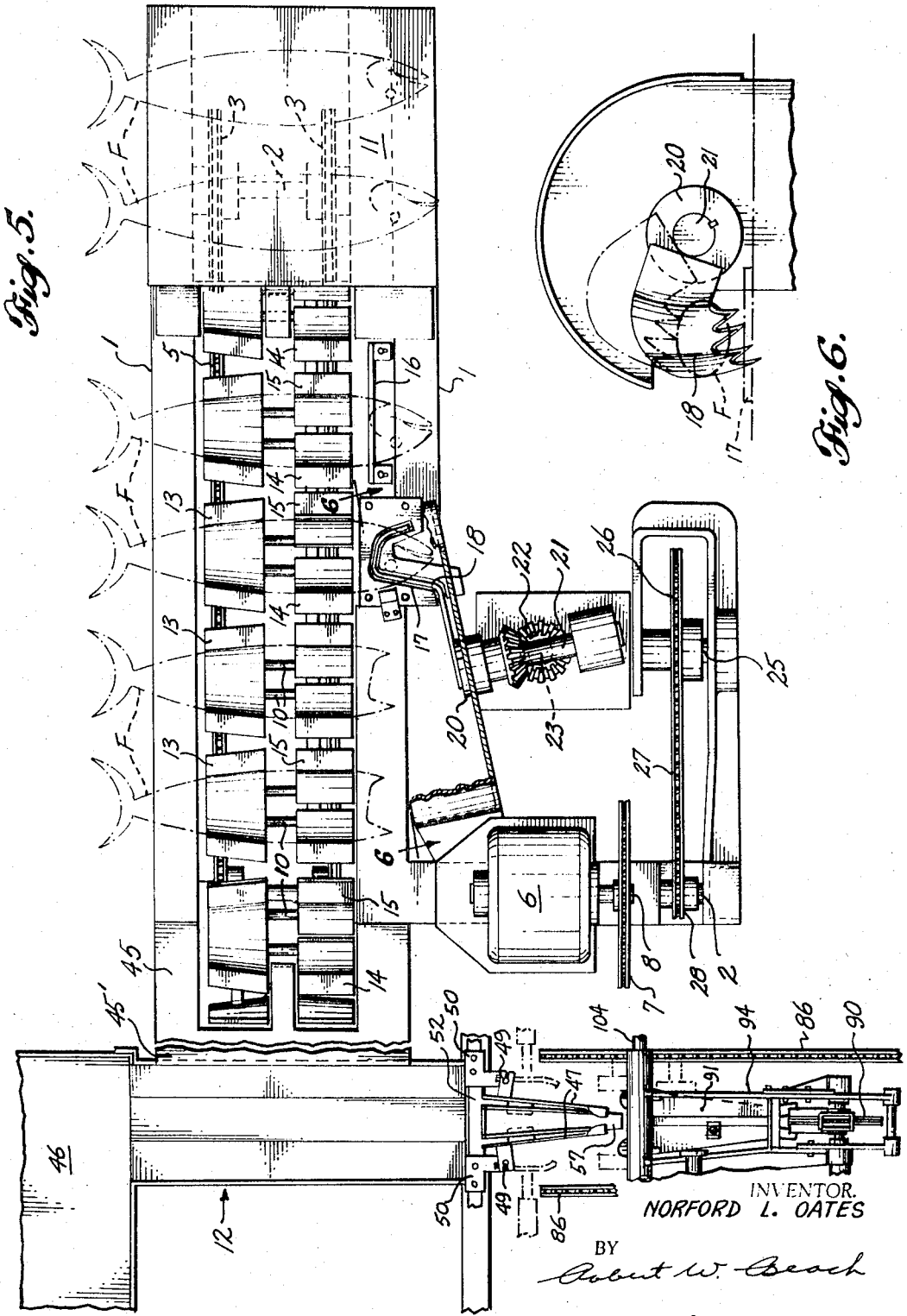

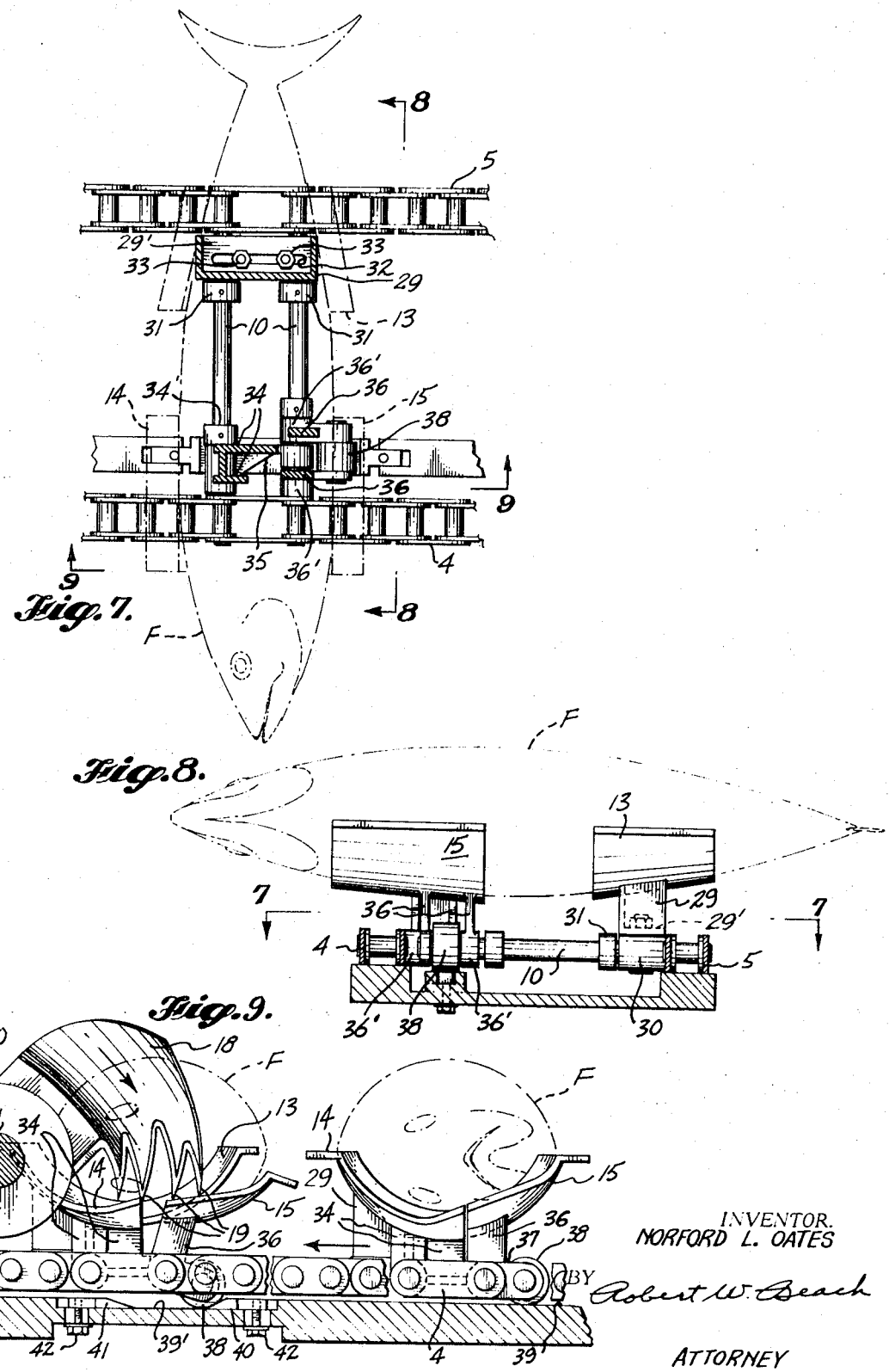

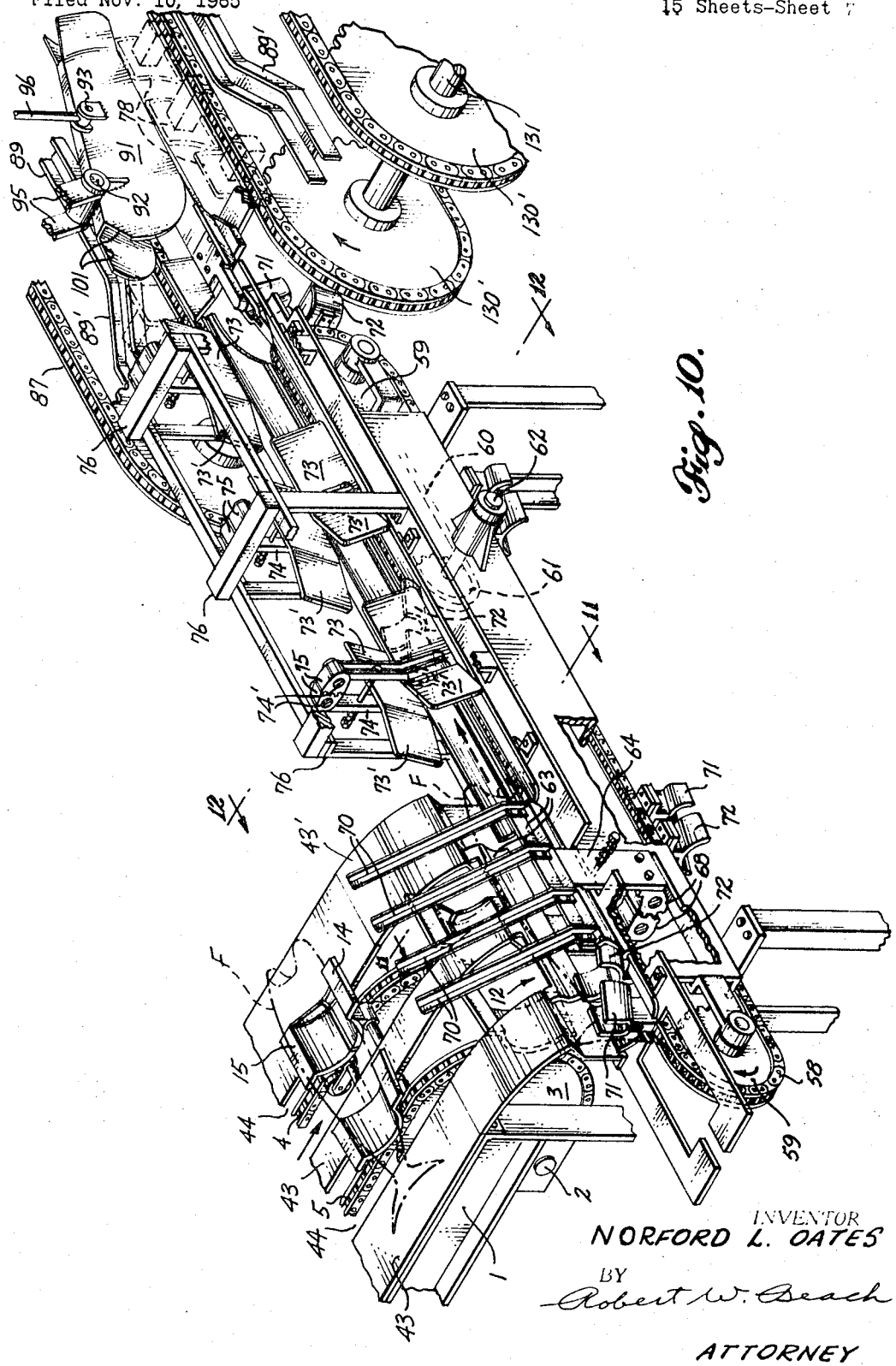

Sept. 30, 1969  N. L. OATES  3,469,278
FISH BEHEADING AND CLEANING MACHINE
Filed Nov. 10, 1965  15 Sheets-Sheet INVENTOR
NORFORD L. OATES
BY
Robert W. Beach
ATTORNEY

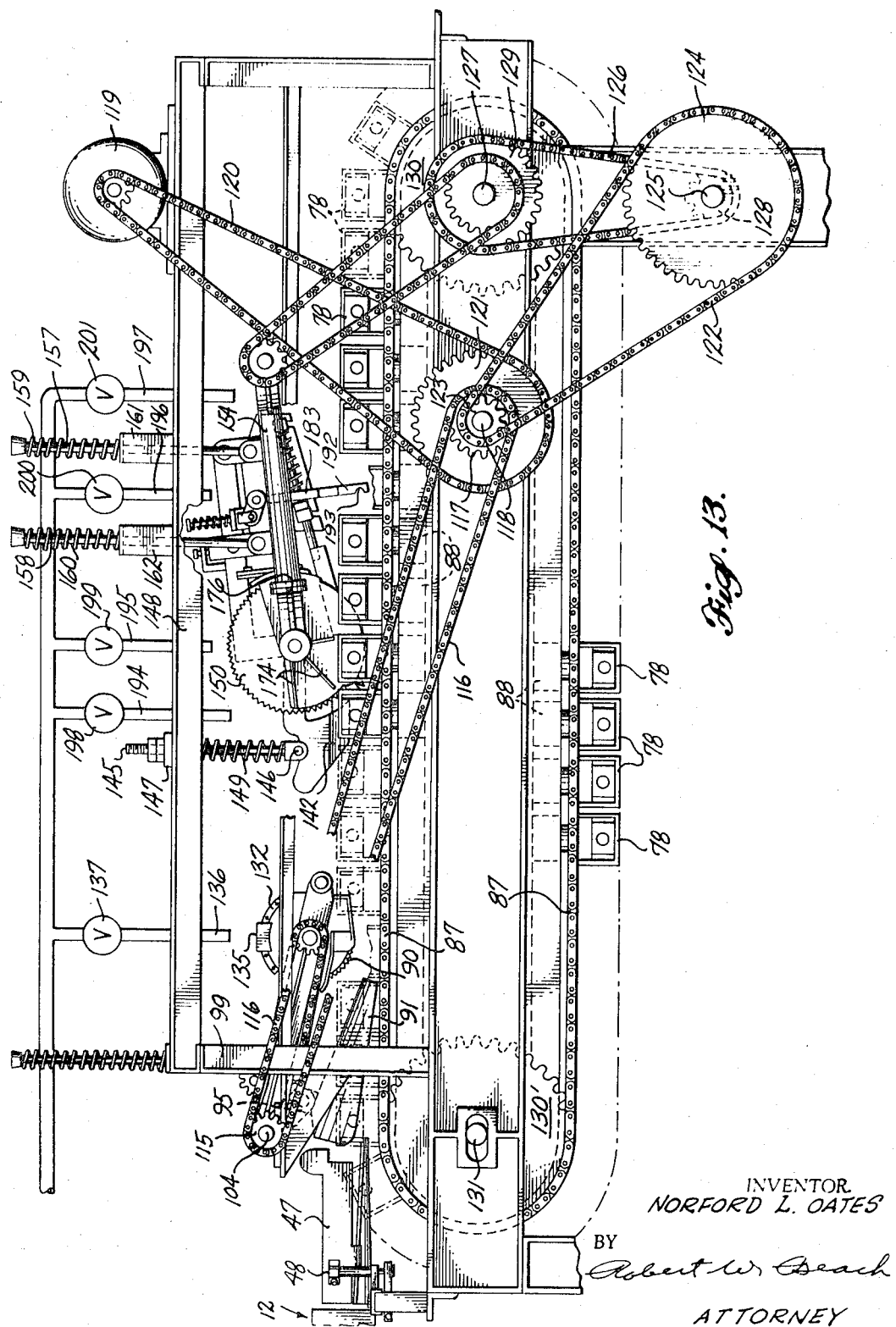

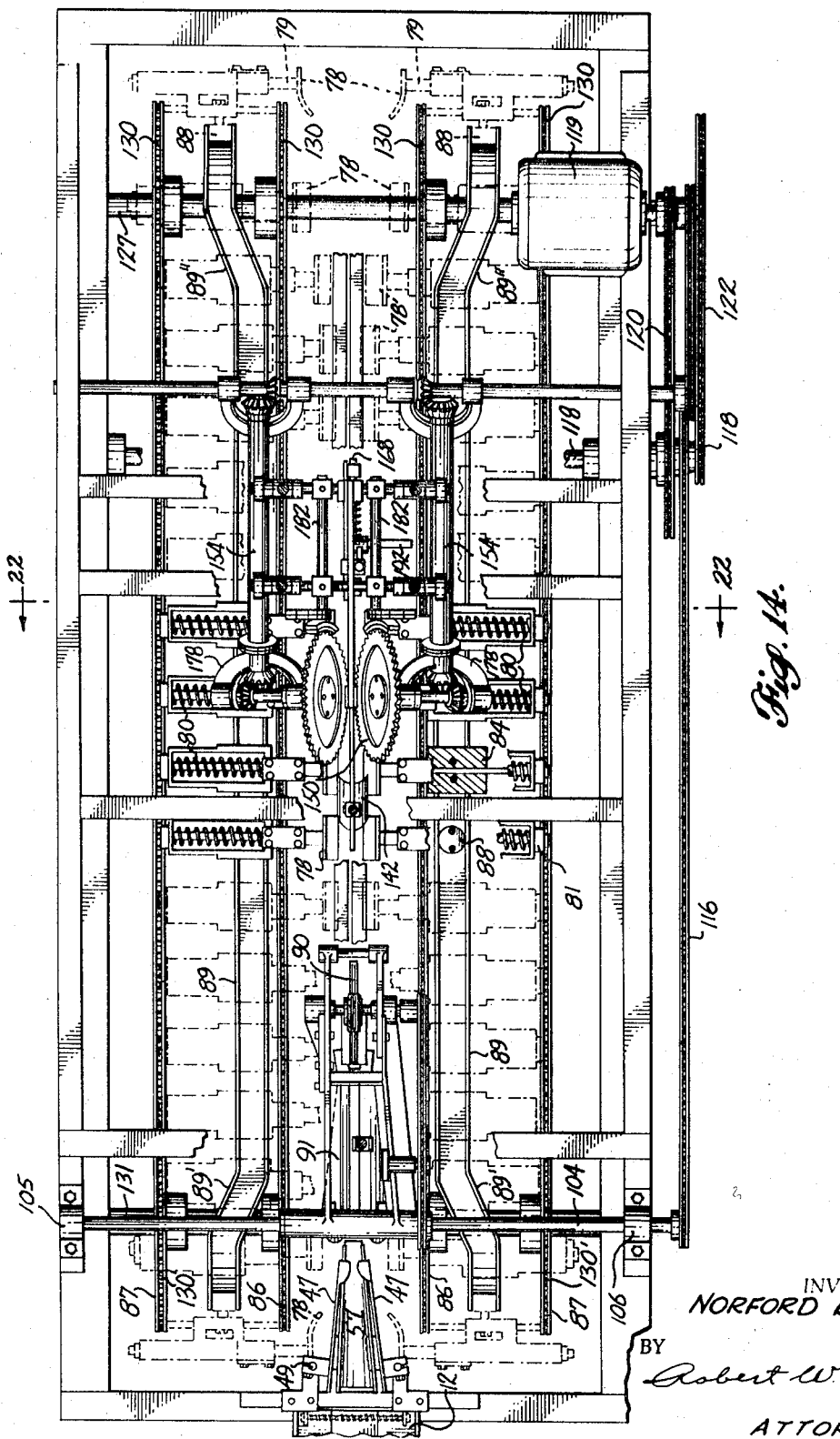

Sept. 30, 1969  N. L. OATES  3,469,278
FISH BEHEADING AND CLEANING MACHINE
Filed Nov. 10, 1965  15 Sheets-Sheet 11
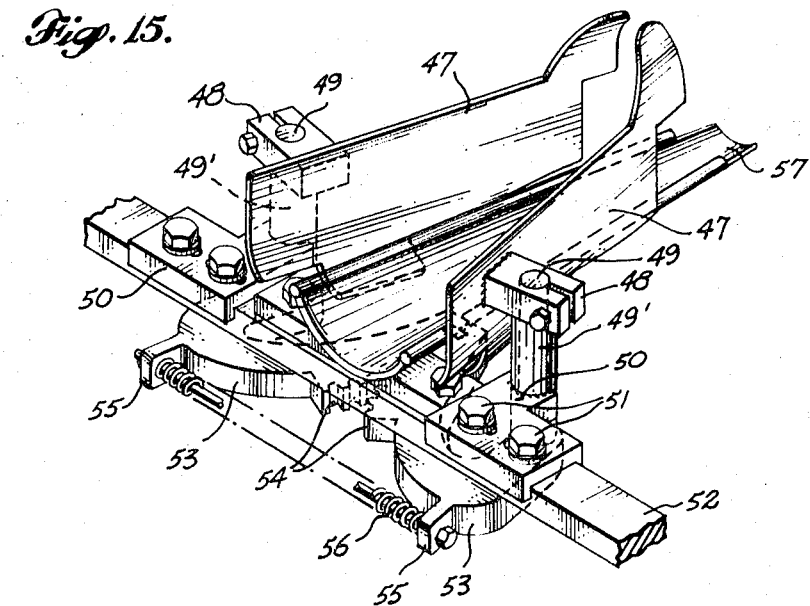
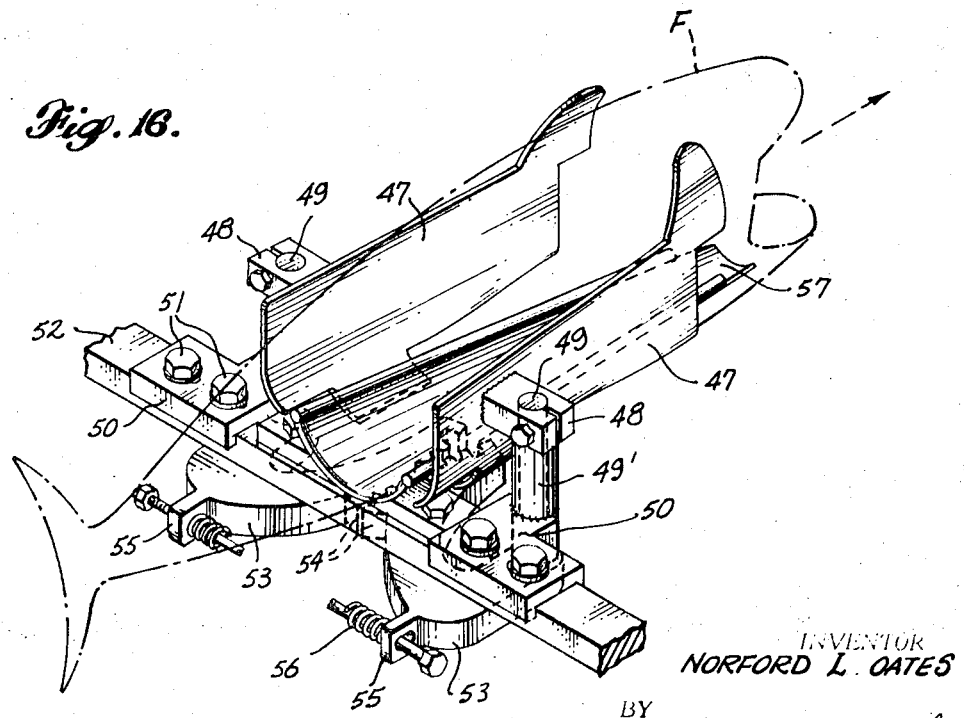
INVENTOR
NORFORD L. OATES
BY
Robert W. Beach
ATTORNEY

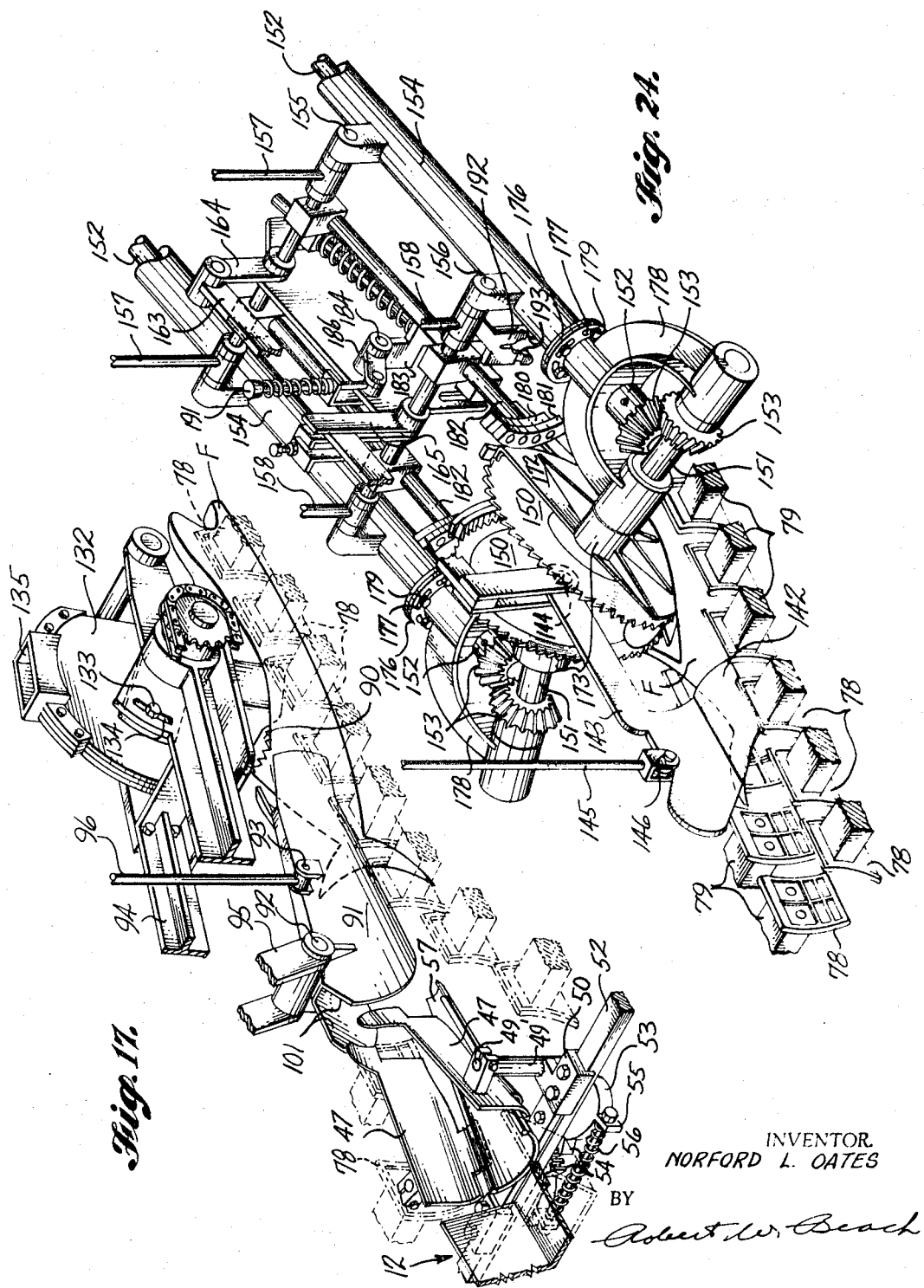

Sept. 30, 1969  N. L. OATES  3,469,278
FISH BEHEADING AND CLEANING MACHINE
Filed Nov. 10, 1965  15 Sheets-Sheet 13
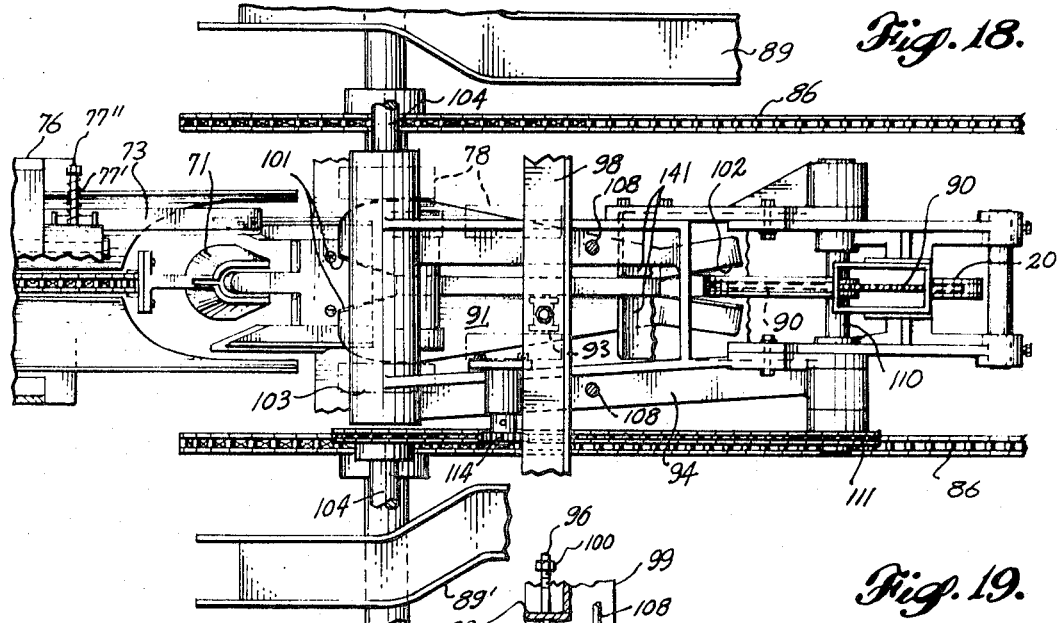
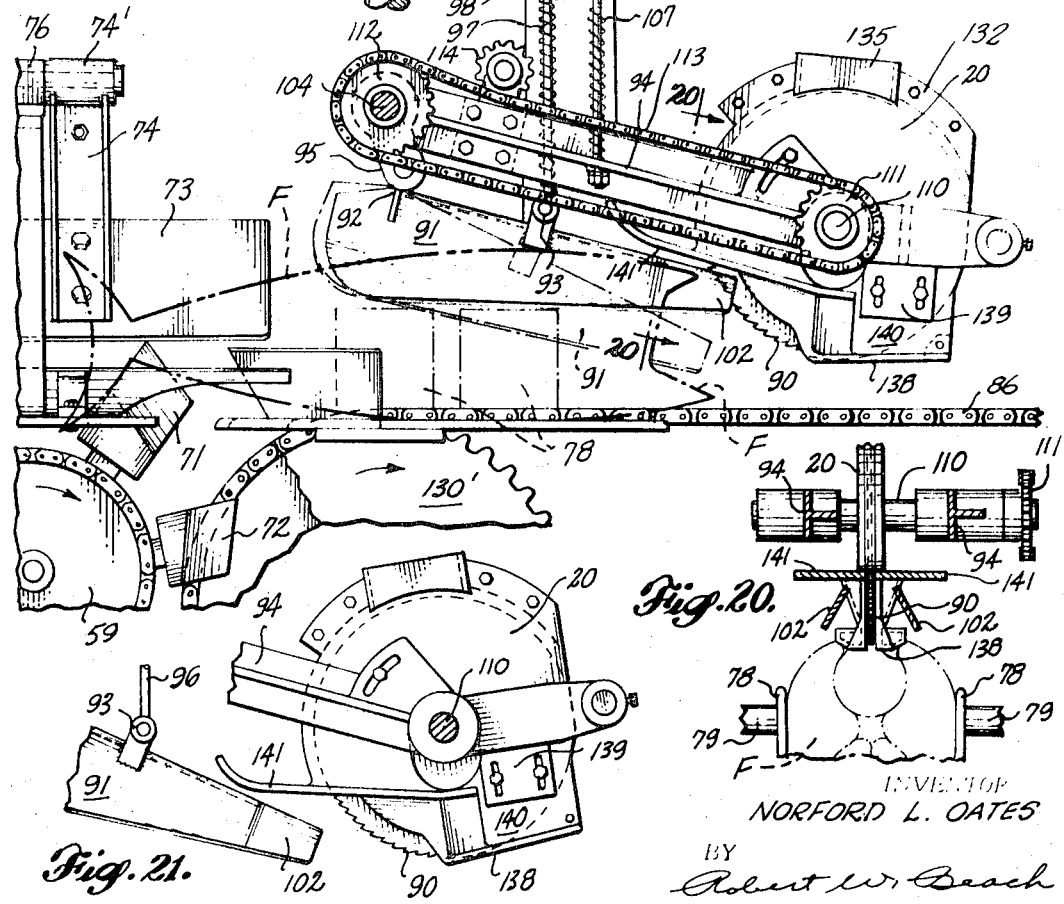
INVENTOR
NORFORD L. OATES
BY
ATTORNEY Sept. 30, 1969  N. L. OATES  3,469,278
FISH BEHEADING AND CLEANING MACHINE
Filed Nov. 10, 1965  15 Sheets-Sheet 14
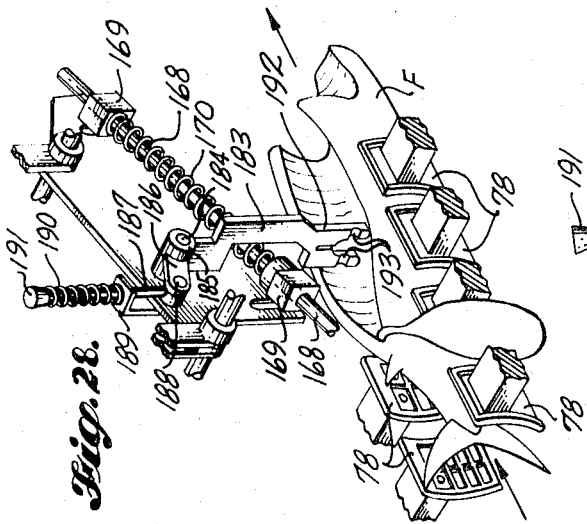
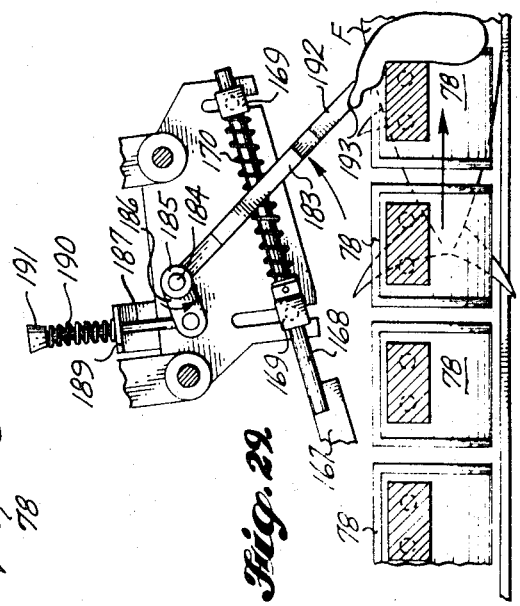
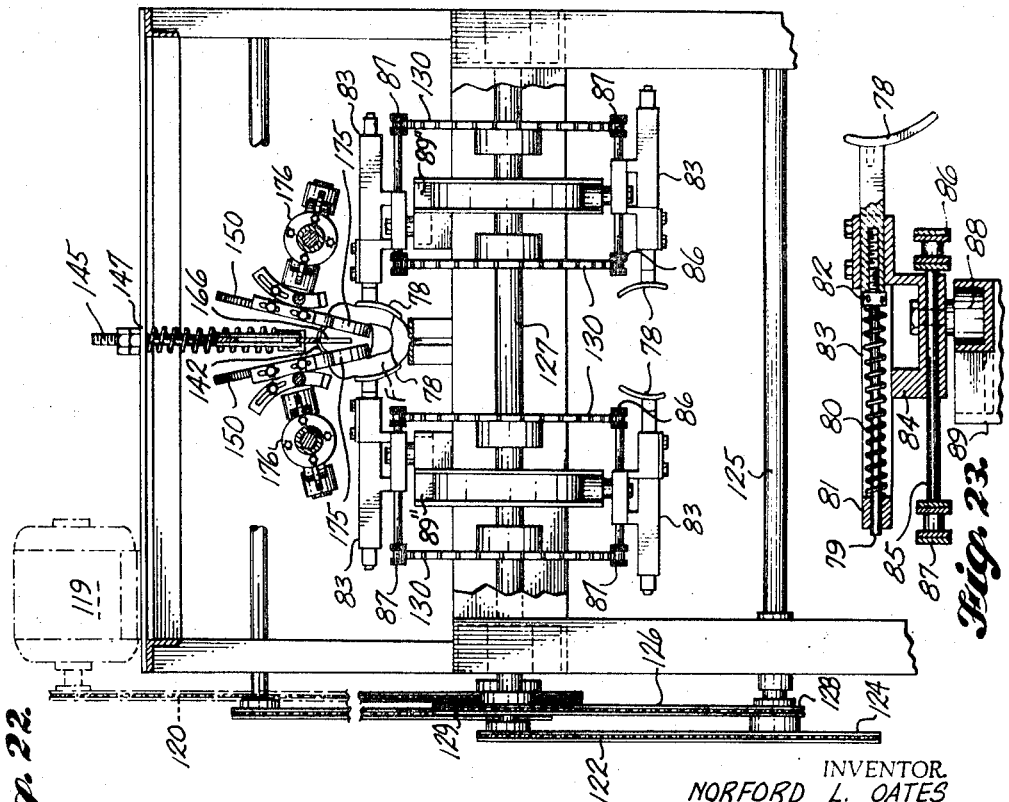
INVENTOR.
NORFORD L. OATES
BY
Robert W. Beach
ATTORNEY

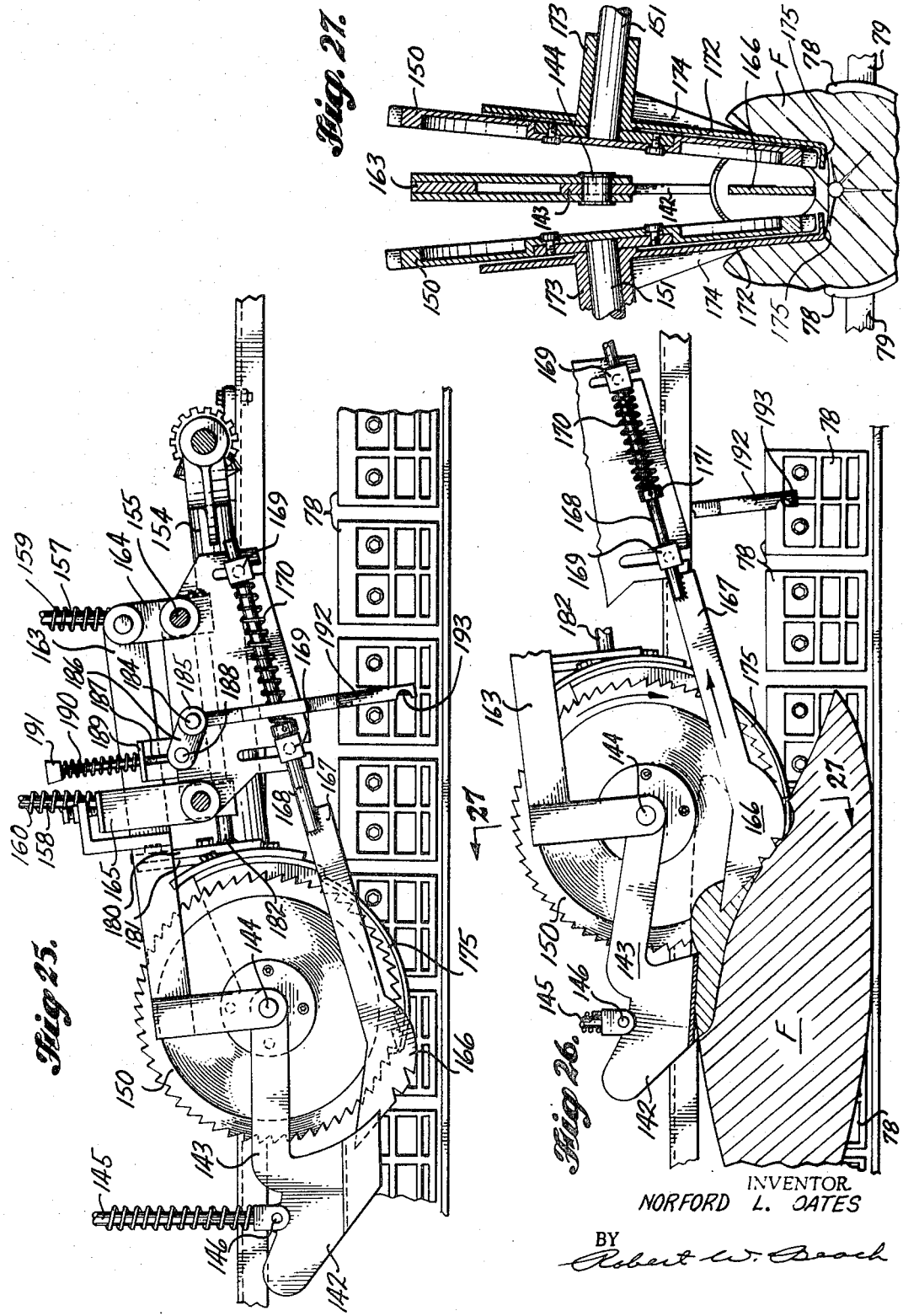

United States Patent Office 3,469,278
Patented Sept. 30, 1969

3,469,278
FISH BEHEADING AND CLEANING MACHINE
Norford L. Oates, Seattle, Wash., assignor to Smith-Berger Manufacturing Corporation, Seattle, Wash., a corporation of Washington
Filed Nov. 10, 1965, Ser. No. 507,148
Int. Cl. A22c 25/14
U.S. Cl. 17—59                                                                 8 Claims

ABSTRACT OF THE DISCLOSURE

Moving cradles carrying fish on their sides past a rotary-beheading knife include a pivoted trailing section which can swing relative to the leading section to provide a dwell for the fish as the knife passes through them. Channels engageable with the tails of fish move the fish through a cleaning section in which the fish belly is slit open by a slitter saw while a fish is held down resiliently by a channel-shaped holding shell, after which upwardly diverging rotating gutter disks scoop the entrails from the fish cavity and a final gut-stripper hook completes the separation of the entrails.

---

The machine is particularly adapted for beheading and cleaning fish of the tuna species, and similar types of fish. Such fish are chunky so that to handle them mechanically presents a problem different from handling fish of other shapes.

It is a principal object of the present invention to provide a machine which can be used to behead and clean fish, particularly of the tuna variety, and which will operate quickly while at the same time functioning accurately to reduce waste.

An important object is to provide such a machine which can operate effectively on fish of different sizes with almost equal efficiency and economy of operation.

In processing fish, both for beheading them and for cleaning them, it is an object to enable the operators to feed the machine easily and for the machine to hold the fish firmly while operating on them.

A further object is to provide a machine which will operate continuously, rather than intermittently, but which nevertheless can operate at a reasonably high speed.

These objects can be accomplished by a machine composed of two sections operating on the fish in sequence, the first section serving to behead the fish and the second section serving to clean the beheaded fish by splitting open the belly cavity and eviscerating the fish.

FIGURE 5 is a plan of such section.

FIGURE 6 is a detail section through the beheading knife section of the machine on line 6—6 of FIGURE 5.

Figure 4:
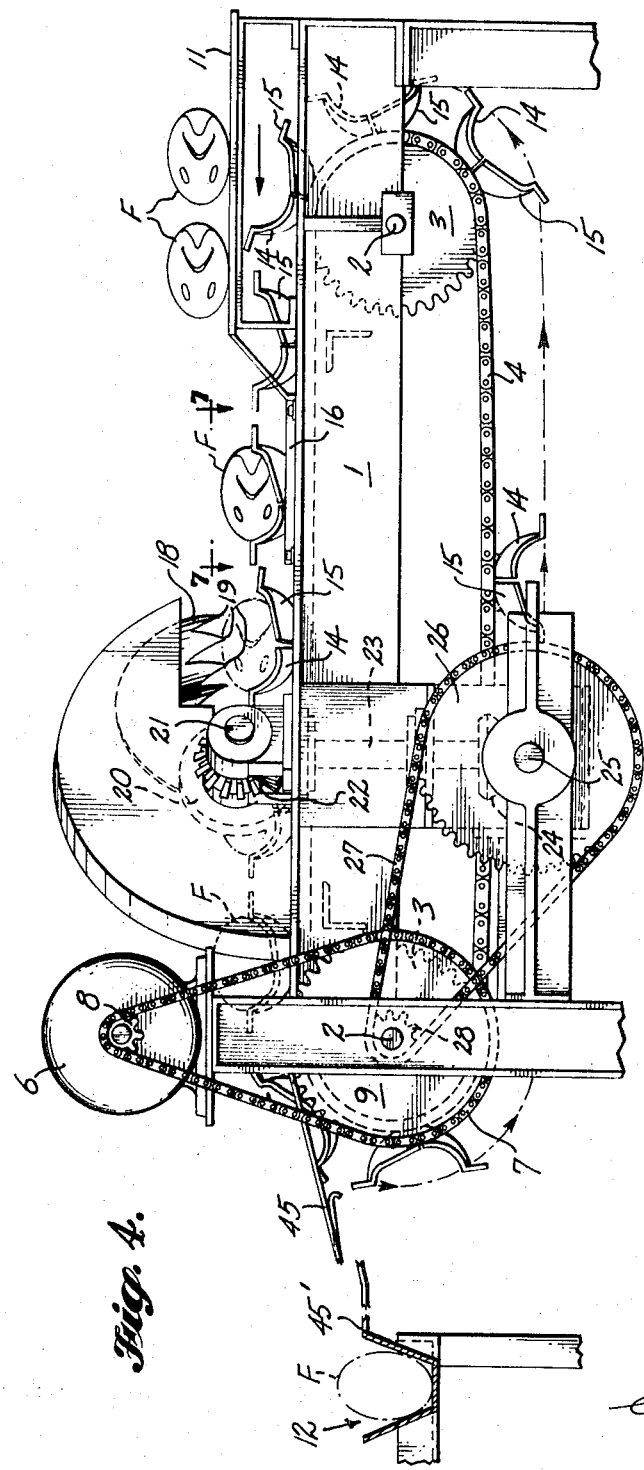
FIGURE 4 is a side elevation of such section.

FIGURE 7 is a detail section through a portion of the beheading section of the machine taken on line 7—7 of FIGURES 4 and 8, and FIGURE 8 is a detail section through the machine taken on line 8—8 of FIGURE 7. FIGURE 9 is a detail elevation through a portion of the beheading section of the machine taken along line 9—9 of FIGURE 7.

Figure 11:
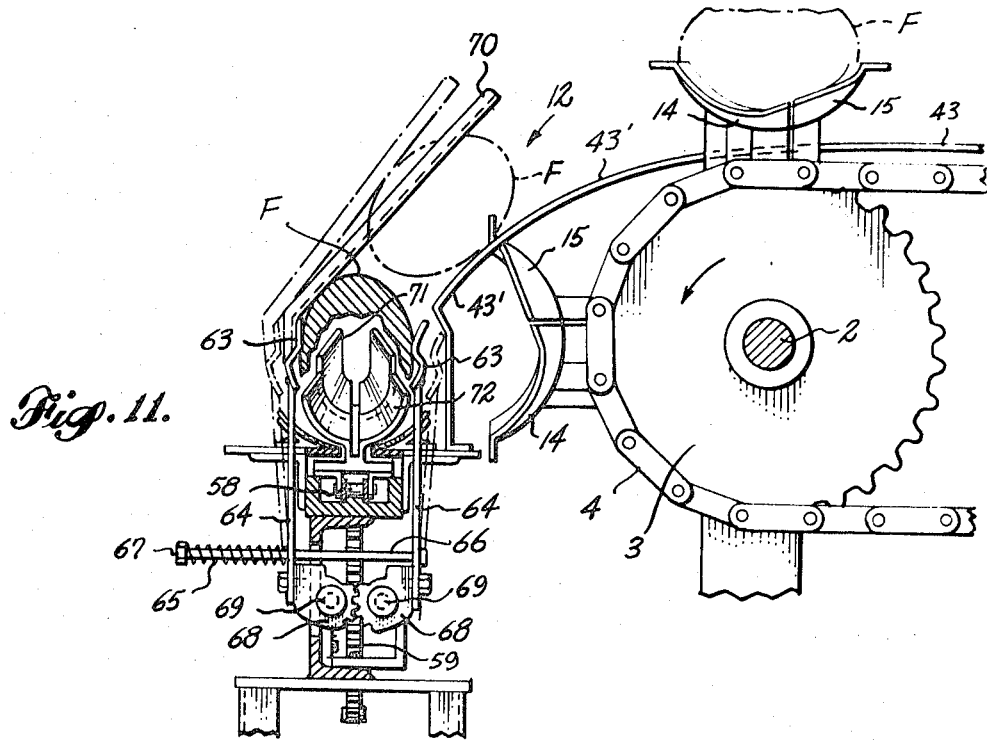
Figure 12:
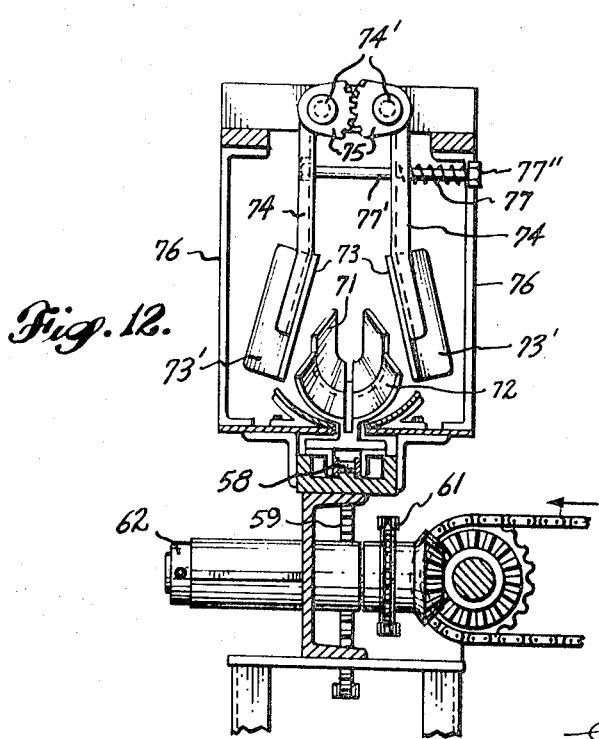

FIGURE 10 is a top perspective of the automatic transfer mechanism between the beheading section and the cleaning section of the machine. FIGURE 11 is a vertical section through such portion of the machine on line 11—11 of FIGURE 10, and FIGURE 12 is a vertical section through such portion of the machine taken on line 12—12 of FIGURE 10.

FIGURE 13 is a side elevation of the cleaning section of the machine, and FIGURE 14 is a plan of such section.

FIGURE 15 is a top perspective of a fish-gripping and guiding device shown in one position, and FIGURE 16 is a similar view of the same device with parts in a different relationship.

FIGURE 17 is a detail top perspective of the fish-slitting device in the cleaning section of the machine, with parts broken away. FIGURE 18 is a plan of such device, and FIGURE 19 is a side elevation of the device. FIGURE 20 is a detail section through such device on line 20—20 of FIGURE 19, and FIGURE 21 is a detail side elevation of a portion of such device.

FIGURE 22 is a transverse vertical section through the cleaning section of the machine, taken on line 22—22 of FIGURE 14.

FIGURE 23 is an enlarged detail vertical section through a fish-holding component of the machine.

FIGURE 24 is a detail top perspective of the gutter device of the machine, and FIGURE 25 is a detail vertical longitudinal section through a portion of the machine showing the gutter device. FIGURE 26 is a detail central longitudinal vertical section through the machine showing the gutter device with parts in a different operative position, and FIGURE 27 is a detail transverse vertical section through the same portion of the machine on line 27—27 of FIGURE 26.

FIGURE 28 is a detail top perspective of the entrail-severing hook feature of the machine, and FIGURE 29 is a detail side elevation of such hook feature.

Tuna fish customarily are frozen in the hold of the tuna fishing boat shortly after being caught, and are kept frozen until they are delivered to the cannery. It is desirable to behead and clean the tuna fish without thawing them appreciably, but this operation is difficult to accomplish manually. The machine of the present invention is designed to behead and clean tuna fish which may still be frozen with the belly portion thawed partially. In using the machine of the present invention the procedure is to behead and clean the fish without removing their fins or tails, after which the fish are cooked slowly for about twelve hours, which will enable the fish to be skinned readily, and their fins and tails removed preparatory to cutting them up and packing them in cans. The function of the present machine is to replace the hand labor of beheading and cleaning the fish in this type of operation.

The beheading section of the machine includes a frame 1 in which spaced shafts 2 are journaled carrying sprockets 3, over which run spaced parallel endless conveyor chains 4 and 5 driven by a motor 6 which turns one of the shafts 2 as a drive shaft. The motor drives shaft 2 by a chain 7 connecting a motor sprocket 8 and a driven sprocket 9 mounted on the shaft. At intervals along their lengths these chains are connected by pairs of spaced parallel rods 10, shown best in FIGURES 7 and 8. Each such pair of rods mounts a fish-carrying contour cradle in which individual fish F are transported from the feed table 11 past a beheading station to the discharge trough 12.

Figure 3:
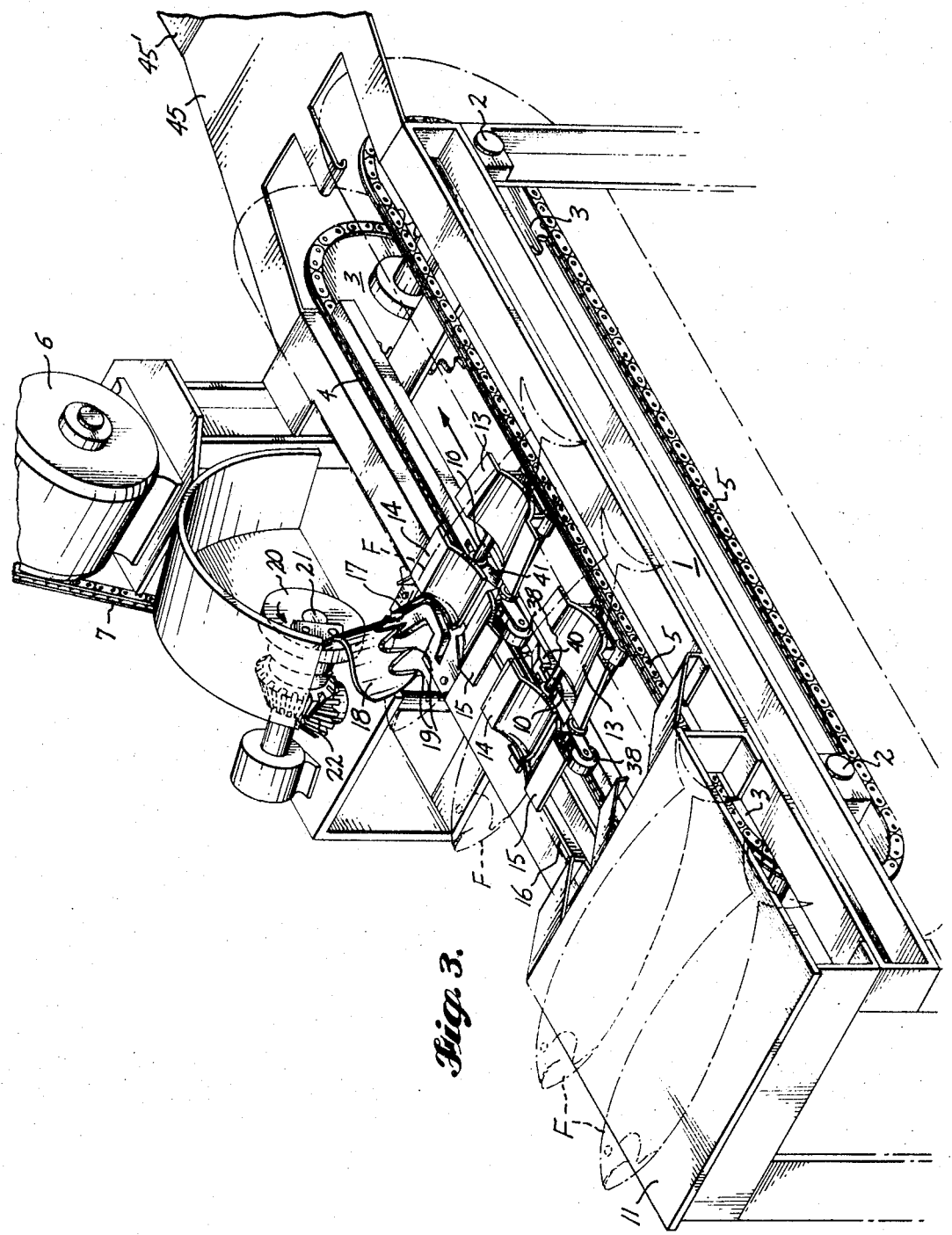
FIGURE 3 is a top perspective of the beheading section of the machine.

As shown best in FIGURES 7, 8 and 9, each fish-carrying cradle is divided into a posterior section 13 and an anterior section which is split longitudinally of the cradle to form a dorsal portion 14 and a ventral portion 15. When these portions of the cradle are in their closed relationship, as shown at the left of FIGURE 3 and at the right of FIGURE 9, the contour of the cradle will be generally complemental to the shape of the largest fish which will be processed by the machine. Because tuna fish are chunky the cradle sections are decidedly concave and the edges of the cradle preferably extend upward substantially to the center of the fish in order to support it reliably.

While the contour cradles, as mentioned above, are designed substantially complemental to the shape of the largest fish which will be processed by the machine, smaller fish will be cradled reasonably securely because the difference in girth between a large tuna fish and a small tuna fish is not great, the difference principally being in the length of the fish. Despite such difference in length between large tuna fish and small tuna fish, fish of various sizes can be accommodated reasonably efficiently by the machine if care is taken to locate each fish properly in the machine. The critical reference point on the fish which should be used for locating the fish in a cradle is the tip of the gill, and such gill tip should be placed in registry with the visual index bar 16. This index bar is in alignment with the crest of the knife passage slot 17 in the table, as shown best in FIGURE 5.

The beheading knife 18 is bent into a hooked shape, as seen in FIGURE 5, conforming to the line of the collarbone of a fish which is to be severed from the body. The cutting edge of the knife has a plurality of impaling points 19 which will pierce the neck of the fish, preferably substantially simultaneously, at circumferentially spaced locations as indicated in FIGURES 4 and 6 so that the action of the knife points slicing through the fish will have a minimum tendency to shift the fish transversely of its length. Such knife is of the revolving type mounted on the flywheel 20, which is secured to skew shaft 21 driven by bevel gears 22. Such gears are turned by an upright shaft 23, in turn driven by bevel gears 24 from a jackshaft 25.

It is important that the jackshaft be driven in synchronism with the conveyor chains 4 and 5, and for this purpose the drive sprocket 26 on the jackshaft can be turned by a chain 27 driven by sprocket 28 on the shaft 2, on which the drive sprocket 9 is mounted. It is then only necessary to adjust the rotative position of the driving mechanism for knife 18 so that it will pass the level of the fish cradles when a cradle is in longitudinal registry with the knife, as shown in FIGURES 4 and 6. The knife should be revolved sufficiently rapidly so that it has an effective chopping action as it passes through the fish. Also, the spacing of the cradles along the chains 4 and 5 will correspond to the size of sprockets 26 and 28 selected, so that shaft 21 is rotated once while the chains 4 and 5 are moved lengthwise through an interval equal to the spacing between adjacent cradles along these chains.

It will be observed in FIGURE 5 that shaft 21 is arranged at an incline to the path of movement of the chains 4 and 5, locating the knife 18 on its upward stroke spaced a sufficient distance from the beheaded ends of the fish carried by the cradles so that there is no possibility of the upwardly moving knife striking a beheaded fish, which might dislodge it from its cradle. Despite the rapidity with which the knife 18 moves on its downward stroke, the cradle carrying the particular fish being beheaded will be moved by the chains 4 and 5 an appreciable distance. Because of the close embrace with which the cradle in its closed condition holds the fish, as illustrated in FIGURE 9, such movement of the chains would tend to produce an undesirably great load on the knife if the cradle were unyielding, or the knife would tend to produce a jagged head cut instead of a clean head cut, or both.

To eliminate the imposition of undesirably large loads on the knife by movement of the fish, and/or the production of a ragged or jagged head cut, the fish-carrying cradle is manipulated at the beheading station to enable the head end of the fish to dwell while the knife is passing through the fish. This objective could be accomplished by moving the chains 4 and 5 carrying the cradles intermittently, but such operation would require complex mechanism and generally would retard the operation of the machine as a whole. Also, since the drive mechanism for the chains 4 and 5 is integrated with the drive mechanism for the knife, an intermittent drive of the chains would require an intermittent drive of the knife just at the time when it is desired to have the knife moving continuously during its passage through the fish. The desired operation is accomplished by splitting each fish-supporting cradle, or at least a portion of it, into leading and trailing sections which are movable relatively in a direction parallel to the path of movement of the fish for a brief interval at the beheading station.

While the entire cradle could be split longitudinally, such a construction is not necessary to provide an adequate dwell for the head end of the fish while the knife is passing through it. It is sufficient for the anterior section of the cradle to be split longitudinally into a dorsal portion 14 and a ventral portion 15, as shown in FIGURES 8 and 9 and mentioned above. The posterior section 13 of each cradle is mounted by a rigid channel-shaped leg 29 having base plate 29' bearing on a block 30 bored to receive the respective rods 10 carried by chains 4 and 5, as shown in FIGURES 7 and 8. This block is secured against sliding along the rods by set collars 31. Leg base plate 29' has an elongated slot 32 in its side adjacent block 30 and is secured to the block by nuts 33 on block bolts extending through the slot. Leg 29 and posterior section 13 can be adjusted relative to the anterior section by sliding the slotted leg relative to the block to alter the attitude of the fish neck relative to knife 18.

To provide the desired dwell of the head end of the fish while the knife 18 is passing through it, the trailing ventral portion 15 of the anterior cradle section is allowed to tilt and thus have its movement retarded relative to the movement of chain 4 while the dorsal portion 14 of the anterior cradle section keeps pace with such chain. While the posterior section 13 of the cradle also will keep pace with the chains 4 and 5, the head end of the fish can dwell sufficiently because the fish can swing slightly in the posterior section of the cradle during such dwell. The dorsal portion 14 of the anterior cradle section is supported by rigid legs 34 secured to a yoke 35 connecting rods 10, and a set collar 34' limits movement of such yoke along these rods.

The trailing ventral portion 15 of the anterior cradle section is supported by legs 36, as shown in FIGURES 7, 8 and 9, which legs are carried by sleeve members 36' embracing the trailing rod 10. Since such sleeves engage only one rod they are able to turn on such rod to rock the legs 36 for tilting the trailing portion 15 of the anterior cradle section between the position shown at the right of FIGURE 9, and the position shown at the left of such figure. The timing and degree of the tilting of the cradle component 15 is controlled by swinging of the crank arm 37 on which the roller 38 is mounted, as shown in FIGURES 7, 8 and 9.

The extent of angular movement of each crank arm 37 and the timing of such movement is accomplished by providing guide means for the rollers 38 in the form of a track 39. As long as this track continues at a uniform height, as shown at the right of FIGURE 9, the roller 38 will be supported to hold the crank arm up in horizontal position and the cradle portion 15 in a position closely adjacent to the leading dorsal cradle potrion 14. At the beheading station, however, a depression 39' is formed in the track and when the roller 38 rides down into this depression the crank arm 37 will swing in a clockwise direction so that the trailing portion 15 of the cradle will swing away from the section 14. Considered alternatively, because of the continued movement of chains 4 and 5 such operation may be regarded as the cradle portion 14 advancing away from the cradle portion 15.

It is preferred that structure of the track means 39 be provided to control the speed with which the cradle parts 14 and 15 are separated, the location along the path of travel of such parts at which the separation of such parts occurs, the length of the stretch of travel over which such separation of the parts persists and the speed with which such parts are moved relatively toward each other into restored adjacent relationship. Such control can be effected by proper selection and location of the track inserts 40 and 41 provided at opposite sides of the track depression 39'. These inserts have inclined portions such that a wheel 38 can ride down the inclined portion of the insert 40 from the raised level portion 39 of the track into the depression 39'. After the roller 38 has traversed the depression 39' it can roll up the incline of the insert 41 for the purpose of swinging the crank arm 37 to restore the cradle portion 15 to adjacent relationship to the cradle portion 14.

It will be evident that the degree of inclination of the sloping portion of the insert 40 will establish the speed at which the two cradle portions 14 and 15 move toward the spread position at the left of FIGURE 9. Also, the degree of inclination of the sloping portion of insert 41 will establish the speed at which the two cradle portions 14 and 15 again move toward each other effected by the roller 38 moving up such sloping portion. Both of these speeds are, of course, relative because they are related to the speed of movement of the chains 4 and 5. The stretch of chain movement over which the cradle parts will remain in separated condition is established by the spacing between the inserts 40 and 41, and each of these inserts can be moved lengthwise of the track means and secured in place by a bolt 42. By the adjustment of such bolts not only the length of the stretch during which the cradle parts are separated can be established, but also the location at which such separation is initiated and also the location at which the cradle parts are restored to their adjacent relationship.

The position of the insert 40 along the track means should be established so that the roller 38 of each cradle will ride down the sloping portion of the insert 40 as the points 19 of the beheading knife 18 begins to penetrate the fish of the particular size being processed. The other insert 41 should then be adjusted so that the roller 38 will begin to engage the inclined portion of such insert when the trailing edge of the knife 18 passes below the bottom of the cradle trough. While the cradle parts are in their spread relationship the knife can then immobilize the head and neck portion of the fish so that it will slide from a position in substantially contiguous engagement with the cradle portion 14 into a position supported principally by the cradle portion 15.

When the knife 18 has passed beyond engagement with the fish the action of the roller 38 rolling up the incline of insert 41 will swing the trailing trough portion 15 toward the leading trough portion 14, and such movement will swing the beheaded neck portion of the fish back toward the cradle portion 14 so that again the entire cradle will embrace the fish reasonably snugly. Carried in this manner by the cradle the beheaded fish will progress along the table, as seen in FIGURES 1, 2, 4, 5 and 10, to the discharge trough 12 indicated in FIGURES 1, 2 and 10.

Figure 1:
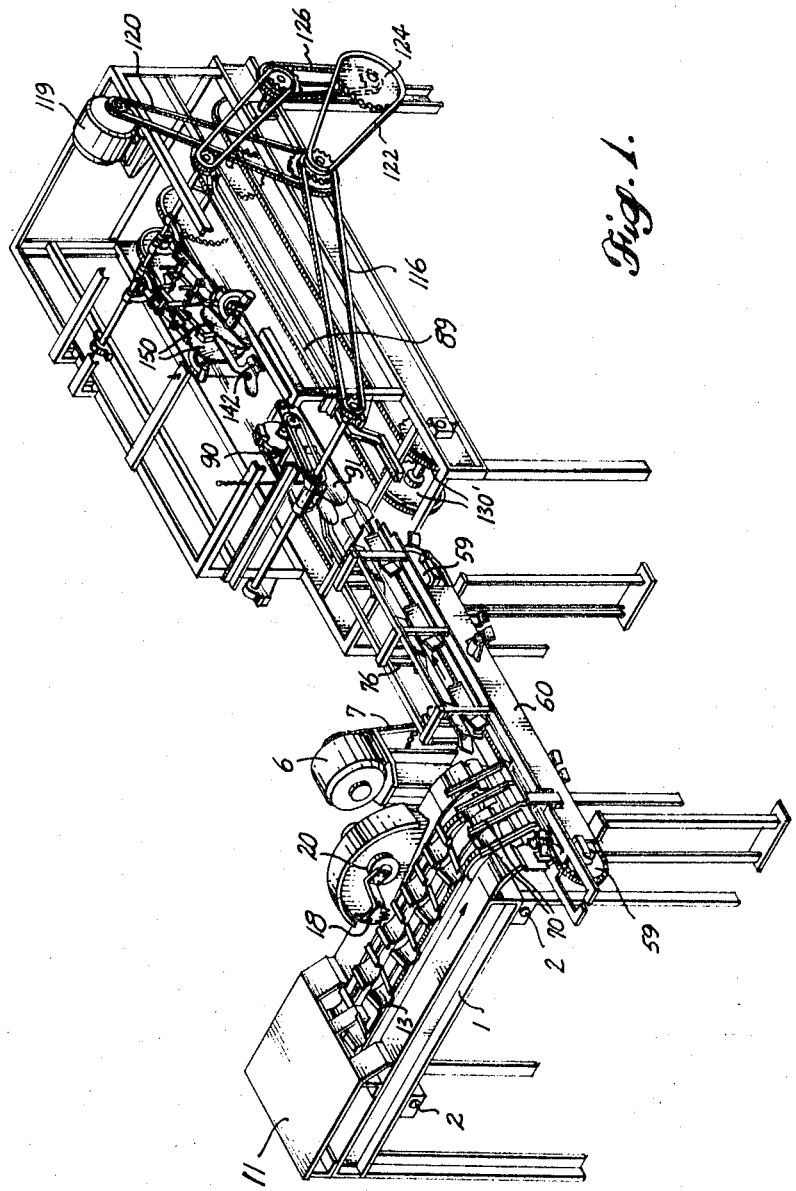
FIGURE 1 is a top perspective of an automatic-feed type of fish beheading and cleaning machine.
Figure 2:
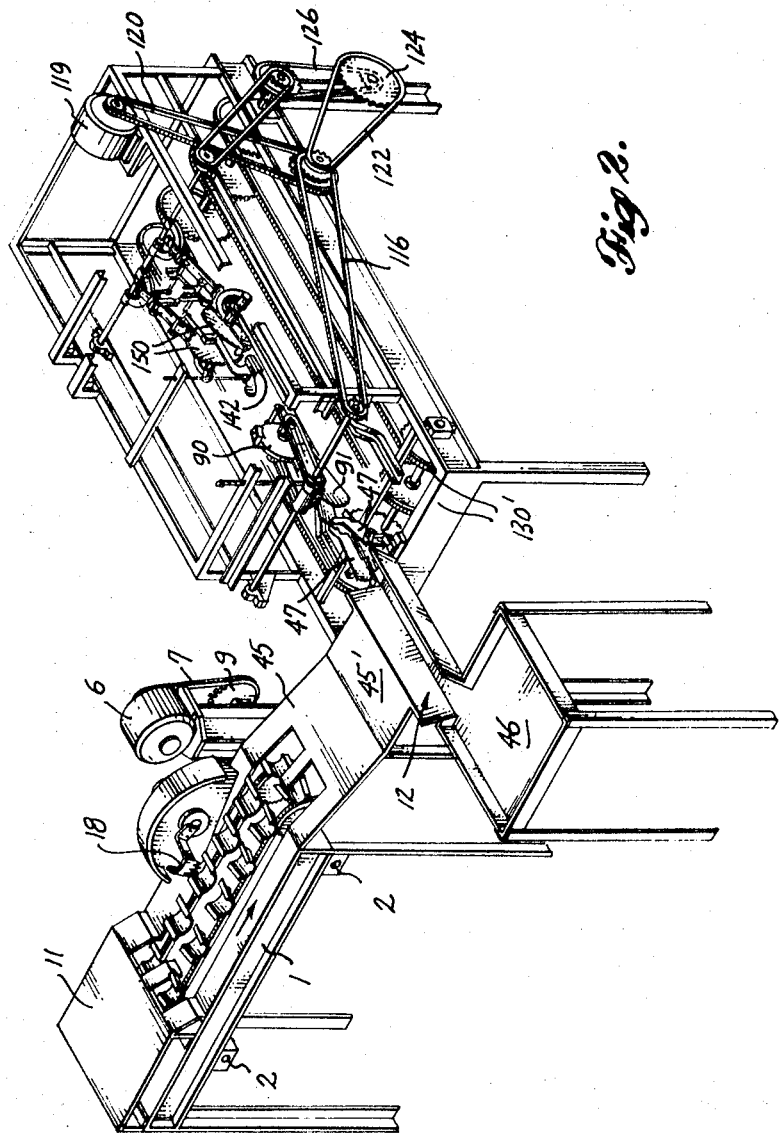
FIGURE 2 is a top perspective of a manual-transfer type of machine.

As indicated in FIGURES 1 and 2, the fish travel along the beheading table in a direction transversely of their lengths and from the beheading table the fish move endwise, neck first, through the cleaning section of the machine in a direction transversely to the direction of movement of the fish through the beheading section of the machine. FIGURES 2, 4, 5, 13, 14, 15 and 16 illustrate mechanism for effecting the transfer of fish from the beheading section to the cleaning section automatically, whereas FIGURE 2 shows a transfer arrangement which requires an operator to effect such transfer. In each case the fish is discharged from the beheading table back first and rolls from a position on its side to a position on its back, as it moves into the discharge trough 12.

At the discharge end of the beheading table are fish-supporting strips 43 arranged in parallel relationship and inclined downward from the path of movement of the fish in the fish-supporting cradles. One of these strips is located between the chains 4 and 5, as indicated in FIGURES 3, 5 and 10, and adjacent strips are separated from the central strip to leave spaces 44 between the strips along which the chains and cradle-supporting legs can move. These strips are spaced apart far enough to enable the posterior cradle section 13 and the anterior cradle section 14, 15 to pass through them. The strips are inclined sufficiently gradually to extend beyond the orbit of such cradle sections as they are swung around the axis of axle 2 at the discharge end of the beheader section of the machine by the chains 4 and 5 traveling around the sprockets 3. During such orbital movement of the cradles the inclined strips 43 gradually wedge each fish F out of its cradle.

In the construction of the machine including the manual transfer section shown in FIGURE 2, the slots 44 between the inclined strips 43 do not extend clear to the discharge trough 12 from the beheading section of the machine. Instead, the strips 43 merge into an inclined ramp 45 which is connected with a transition platform 45'. This transition platform is located alongside the trough 12 so that an operator standing adjacent to the trough can grasp a fish on the transition platform, slide it into the discharge trough and move the beheaded fish neck first along such trough into the cleaning section of the machine. At the end of trough 12 opposite the cleaning section of the machine is an accumulating table 46 on which a few fish can be accumulated from time to time, as may be necessary, if the operator is unable to feed to the cleaning section of the machine sufficiently rapidly fish which are discharged from the beheading section of the machine.

The manner in which a fish is lodged in the discharge trough 12 of the machine with its back down by the operator is shown in FIGURE 4. Fish are fed individually from the discharge trough into the cleaning section of the machine by the operator grasping the fish adjacent to its tail end and sliding such fish downward, as seen in FIGURE 5, or to the right, as seen in FIGURES 13 and 14. A fish thus thrust into the entering end of the cleaning section of the machine will be moved into the fish-orienting holder shown best in FIGURES 5, 13, 14, 15 and 16. Such holder includes the two cooperating fish-engaging plates 47 which are secured by clamps 48 on rods 49 rotatable in tubes 49' secured to mounting blocks 50. Clamps 48 rest on the upper ends of such tubes.

The mounting blocks 50 are secured by cap bolts 51 in desired positions of adjustment lengthwise of a bar 52. The spacing of the blocks 50 can be adjusted to move the posts 49 closer together or farther apart. On the lower ends of such posts are mounted plates 53 on which are formed meshing gear quadrants 54 settable in proper meshing relationship by the relative adjustment of blocks 50. Such plates also carry lugs 55 between which a compression helical spring 56 is engaged encircling suitable guide rods.

Movement of a beheaded fish between the near ends of the plates 47, as seen in FIGURE 15, will wedge the swinging ends of the plates apart such as to the position of FIGURE 16. A shallow trough 57, located between the plates 47, will support the back of the fish. The plates 47 are of a length such that when a fish is pushed between them its beheaded end will project a substantial distance beyond the swinging ends of the plates 47 so that such fish end can be gripped by the feed mechanism of the cleaning section of the machine and moved through such cleaning section in the manner illustrated in FIGURES 13 and 14.

Instead of the fish being moved from the transition platform 45 into the beheader section discharge trough 12 by hand, as discussed above, automatic mechanism can be used to transfer the fish from the beheader section of the machine to the cleaning section. Such automatic mechanism is shown in FIGURES 10, 11, 12, 18 and 19.

In such automatic transfer mechanism the discharge trough 12 is located closer to the end of the beheading section of the machine, as shown in FIGURE 11, than in the case of the manual transfer mechanism, as shown in FIGURES 2 and 4. In this instance, therefore, the inclined strips 43 have curved sections 43' bending directly downward into the discharge trough 12. A chain 58 extending around sprockets 59 has its upper stretch passing through the bottom of the discharge trough 12 transversely of the direction of movement of the fish into such discharge trough. One of the sprockets 59 is driven by a chain 60 extending around a drive sprocket 61 mounted on shaft 62. This sprocket is connected to be driven by the drive motor 6 of the beheading section of the machine through a chain and bevel gearing shown at the right of FIGURE 12, so that movement of the fish along the discharge trough 12 will be coordinated with movement of the fish into such trough by the beheading section of the machine.

In order to position the fish accurately with respect to the chain 58 a spring-pressed fish-embracing device shown in FIGURES 10 and 11 is located at the discharge end of the beheading table to form or cooperate with the discharge trough 12. Such device includes two side plates 63 carried respectively by arms 64 which are pressed toward each other by a helical compression spring 65 encircling rod 66, which extends through apertures in said arms. Such spring is engaged between the head 67 on an extension of such rod and one of the arms 64. Swinging of the arms 64 is coordinated by mounting such arms on intermeshing gear quadrants 68, which are rotatively mounted on shafts 69, respectively. One of the plates 63 extends generally between the feed chain 58 and the downwardly curved portion 43' of the strips 43. To prevent any possibility of a fish sliding down the inclined strips 43' with sufficient velocity to jump over the discharge trough 12, rails 70 extend upward from the plate 63 remote from the beheading section and they are inclined toward such section for engagement with the fish as hold-down members.

As a fish is dumped from a cradle 13, 14, 15 it will slide down the strips 43 into engagement with the rails 70 and press these rails back to spread the plates 63 by the interaction of the gear quadrants 68 in opposition to the force exerted by spring 65. The conjoint movement of plates 63 embracing the fish will insure the fish is centered in the discharge trough 12 with respect to the feed chain 58. To the feed chain are secured fish tail-pushing means shown as a trailing channel 71 and a leading channel 72, which open upward. Such tail-pushing channels can be engaged with the tail of a fish, either by the fish dropping into the discharge trough 12 in a position lengthwise of such trough such that the tail of the fish is in registry with the channels 71, 72, or such channels can move relative to the fish toward its body in order to engage the channels with the tail portion of the fish. In either case, by engagement of the channels 71 and 72 with the tail portion of the fish, such fish will be shifted lengthwise positively toward the cleaning section of the machine.

It is desirable for each fish to be moved into the cleaning section of the machine with its back downward. It is not practical, however, to provide fish-embracing means which will engage the sides of the fish over virtually its entire length as it is moved by the chain 58 because it is necessary for the feed mechanism of the cleaning section of the machine to be able to grip the opposite sides of the fish for movement. Consequently, fish-stabilizing means are provided which include fish-engaging plates 73 located to be engaged with opposite sides of a fish. The plates of each pair are suspended by arms 74 swingably supported by pivots 74'. The pivoted ends of such arms carry intermeshing gear quadrants 75 which coordinate swinging of the arms so that the plates 73 will always be located at equal distances on opposite sides of a vertical plane through the chain 58.

The pivots 74' are mounted on frames 76 which are stationary so that the plates 73 do not travel with the fish. The arms 74 normally are pressed into a position of minimum plate opening by a helical compression spring 77 mounted on a rod 77' extending through the arms 74. The ends of such spring engage a head 77" on such rod and the adjacent arm 74. To facilitate movement of the fish between such plates it is preferred that the end portions 73' of such plates first engaged flare toward the approaching fish. As the fish is pushed between the plates 73, therefore, it will wedge them apart, but the engagement of the plates with the fish will maintain the central plane of the fish approximately vertical. Several pairs of these fish-stabilizing plates can be provided in succession along the chain 58, if desired, as shown in FIGURE 10.

Whether the fish are transferred from the beheading section of the machine to the cleaning section of the machine manually or automatically they must be presented to the cleaning section in a manner to enable the feed means for such section to move the fish through it. In the operation of the cleaning section of the machine the belly of the fish must be slit open and the entrails scooped out. Consequently, the fish must be moved through the cleaning section of the machine by feed mechanism which does not obstruct the upper belly portion of the fish. The entire length of the cleaning section through which the fish must be moved is shown in FIGURES 13 and 14.

The feed means for the cleaning section of the machine includes fish-clamping plates 78 arranged in series on opposite sides of the vertical central plane of the cleaning section. As shown in FIGURE 23, each of these plates is mounted on the end of a push rod 79 which is pressed toward the center of the machine by a helical compression spring 80 encircling such rod. One end of such spring bears on the end 81 of guide means guiding the rod for reciprocation, and the other end of such spring bears on an enlargement 82 of such rod. The rod-supporting and guiding frame 83 is supported by mounting 84 which in turn embraces and is guided for reciprocation along rod 85, carried by and connected between an inner chain 86 and an outer chain 87.

The fish-engaging plates 78 are shaped to conform generally to the sides of the fish which they engage, and also are constructed to grip and support the fish. As well as such plates being concave, therefore, their lower portions project toward the center of the machine farther than their upper portions so as to provide a lifting action or supporting action on the fish. In addition, it is preferred that the fish-engaging side of each plate have depressions in it so as to provide a ribbed construction which will concentrate the pressure of the plates on the fish as seen in FIGURE 25, for example. In addition, each depression may provide at least some suction-cup gripping effect on the fish. The clamping plates are pressed against the sides of the fish by the force of springs 80 as the mounts 84 for the rod guide means 83 are moved along rods 85 into fish-feeding position.

As shown best in FIGURES 13 and 14, the chains 86 and 87 form complete loops extending through the cleaning section of the machine. Each of these chains is in an upright plane and the mounts 84 can be slid transversely of such planes between the chains along the connecting rods 85. Movement of the mounts 84 is effected by displacement of rollers 88 depending from the mounts 84 and rotatable about upright axes. These rollers fit reasonably snugly in tracks 89 of channel-shaped cross section opening upwardly, which are shown in FIGURES 14 and 23. These cam tracks are endless, being arranged between the chains 86 and 87 and having generally the same contour. Adjacent to the feed end of the cleaning section, as shown at the left of FIGURE 14, such tracks have inclined portions 89' sloping toward the central portion of the machine for drawing the feed means mounts 84 toward the fish. Adjacent to the discharge end of the cleaning section of the machine, portions 89" of the channel cam track 89 are inclined away from the central plane of the machine, as seen at the right of FIGURE 14, to shift the mounts 84 away from each other so that the fish-clamping plates 78 will be withdrawn from the fish to release them.

The oppositely inclined portions 89' of the cam tracks are located immediately beyond the plates 47 and trough 57 of the fish-orienting holder in the case of the machines having manual transfer means between the beheading section and the cleaning section of the machine. Such inclined cam sections are located immediately beyond the last pair of fish-stabilizing means plates 73 in machines having the automatic means for transferring fish from the beheading section to the cleaning section described above, as shown in FIGURES 10, 18 and 19. In either case the fish-clamping plates 78 will have engaged opposite sides of the fish firmly by the time such feed means have moved a fish into a position to enable the slitter saw 90 to cut open the belly of the fish.

The position of the fish-slitting saw 90 with respect to the entire cleaning section of the machine is shown in both FIGURE 13 and FIGURE 14. Details of the slitter saw mechanism are shown more clearly in FIGURES 17 to 21. Because the fish being processed are frozen in many instances it is desirable to hold the fish firmly against the force exerted on the fish by the action of cutting open the belly. If the fish is not frozen it is desirable to hold the soft flesh of the fish firmly for presentation to the slitting saw. In either case, it is desirable to engage the upper portion of the fish reasonably closely and firmly by the downwardly concave shell 91, which appears in FIGURES 13, 14, 17, 18 and 19.

The shell 91 is supported immediately ahead of the slitter saw 90 by pivots 92 and 93 suspended from the slitter saw frame 94. Pivot 92 is suspended from such frame by short bars 95 which locate the pivot 92 definitely in relation to the slitter saw frame 94. Pivot 93, on the other hand, is a floating pivot being carried by the end of upright rod 96 around which the helical compression spring 97 is wound. The upper end of rod 96 extends slidably through an aperture in a bracket 98 mounted on frame element 99, against which bracket the upper end of spring 97 bears. Preferably the upper end of rod 96 is threaded and a nut 100, or other enlargement on the rod end, can engage bracket 98 to limit downward movement of the pivot 93. Such rod is urged downward by the compression spring 97, the lower end of which bears against the mounting for such pivot.

It may be desirable for the feed end of the shell 91 to have in it a notch 101 and the discharge end of such shell may be flared and have in it a notch 102 straddling the slitting saw 90. The main body of the shell 91 preferably flares toward its feed end so that a fish of any size to be processed can be received readily by the feed end, but the shell will tend to embrace such fish more closely as it is moved toward the saw by the clamping plates 78 of the fish-feed means. The pivot 93 will tend to be held closer than the pivot 92 to the clamping plates 78 by the compression spring 97, but such floating pivot will be raised in opposition to the force of spring 97 as the fish approaches the slitter saw. As the pivot 93 is raised by the pressure of the fish against the lower side of the shell 91, the force of the spring 97 acting downward on the pivot 93 will increase so that the fish will be embraced and held more firmly as it is fed to the slitter saw.

One end of the slitter saw frame 94 is mounted on a sleeve 103 through which a supporting shaft 104 extends. This shaft bridges across the frame of the cleaning section of the machine and its opposite end portions are journaled in bearings 105 and 106, as seen in FIGURE 14. The slitter saw 90 is supported by the end of frame 94 opposite sleeve 103, so that the slitter saw can rise and fall to accommodate its position to the size of the fish being slit and the location of the saw lengthwise of the fish. A helical compression spring 107 encircling guide rod 108 slidable through a fixed frame member or bracket 98 extending horizontally between parallel frame elements 99 reacts between such frame member and the slitter saw frame 94 tending to swing the saw-mounting end of the frame downward to insure effective engagement of the slitter saw with each fish.

It is necessary to effect rotation of the slitter saw 90 in order to enable it to produce an effective cutting action on the fish. For this purpose the axle 110 of the slitter saw carries the sprocket 111, a cooperating sprocket 112 is secured to shaft 104 and a chain 113 extends around such sprockets and is kept tight by the tightener sprocket 114 mounted on the slitter saw frame. As shown in FIGURE 13, shaft 104 is turned by sprocket 115 secured to an end of such shaft projecting beyond a side of the cleaning section of the machine. This sprocket is rotated by a chain 116 connecting it with sprocket 117, which is mounted on a jackshaft 118. This jackshaft is driven by a motor 119 through a chain 120, which engages a large sprocket 121 on such shaft to reduce its speed.

Another chain 122 connects a small sprocket 123 on such jackshaft with a large sprocket 124 on a second jackshaft 125. This jackshaft is connected by a chain 126 to the shaft 127 for driving feed chains 86 and 87. The sprocket 128 on shaft 125 engaged by chain 126 is small and the sprocket 129 on shaft 127 is large, to obtain a further reduction in speed. Chains 86 and 87 engage sprockets 130 on shaft 127 and 130' on shaft 131 at the opposite ends of the chain orbits. Since the chains of the feed means and the drive for the slitter saw 90 are both taken from jackshaft 118 the speed of the fish feed and the speed of the slitter saw are coordinated.

The slitter saw 90 rotates in a direction such that the teeth move from the interior of the fish toward its exterior. Pressure of the shell 91 on the belly of the fish at opposite sides of the saw assists its cutting action. The upper portion of the saw is covered by the shield 132 shown in FIGURE 17. The rotative position of this shield is adjustable rotatively by movement of a securing cap bolt 133 along an arcuate slot 134 in an arm of slitter saw frame 94. FIGURES 17, 19 and 21 show the saw shield in three different rotative positions, respectively. In the upper portion of the saw shield is a passage 135 leading to its interior through which a jet of water may be projected from a pipe 136 shown in FIGURE 13, which is controlled by a valve 137. Such water flushes the belly cavity of the fish laid open by the slitter saw, and also continually cleanses the saw so as to prevent the accumulation of material on the sides of the saw and in the throats of the teeth to reduce the cutting efficiency of the saw.

To regulate the depth to which the slitter saw 90 cuts, a pilot shoe 138 is mounted on the bottom of the saw shield. The elevation of this pilot shoe relative to the saw frame can be adjusted by sliding the securing cap bolts 139 in slots 140, shown in FIGURE 19, up or down relative to the slitter saw frame. Such pilot shoe rides in the cavity of the fish to limit the cut. Such pilot shoe also carries a gauge bar 141 extending beyond the feed side of the saw shield to ride on the exterior of the fish for assisting in limiting the depth of saw cut.

As the fish is moved by the clamping feed means to the right, as seen in FIGURES 13 and 14, from the location of the slitter saw 90 the belly cavity of the fish is opened up by entrance of the plow 142 into the slit shown in detail in FIGURES 24, 25, 26 and 27. Such plow is supported for elevational movement by being mounted on the swinging end of a bar 143, which is supported by pivot 144. Downward movement of the plow is limited by the elevational movement of up right rod 145 secured to the upper portion of the plow by pivot 146. The upper end of this rod is suspended by a head or nut 147 engaging the upper side of a horizontal frame member 148 of the cleaning section. The plow is urged downward by a helical compression spring 149 encircling the rod 145, as shown in FIGURE 13.

The plow 142 has an upper fin to enter the slit cut in the fish belly by the slitter saw, below which is a curved lower portion that spreads apart the sides of the slit belly cavity to enable a pair of spaced gutter disks 150 to enter the cavity. The bottom of such lower portion is concave and rides over the entrails in the belly cavity. Such gutter disks are shown in FIGURES 13, 14, 22, 24, 25 and 26. The peripheries of such gutter disks have teeth on them and such disks turn in the direction indicated by the arrow in FIGURE 26 so that the lower portions of the disks move upward and outward of the fish cavity toward the feed side of such disks. As shown most clearly in FIGURES 14, 22 and 24, the gutter disks are arranged so that such disks diverge upwardly enabling the lower portions of such disks, which are close together, to eviscerate the fish. The outer points of the teeth are rounded to avoid tearing the surface of the cavity.

The disks are supported and rotated by shafts 151 which are driven by shafts 152 through bevel gears 153. Such shafts are supported by the gutter frame 154, which is suspended by two shafts 155 and 156. The shafts 155 and 156 in turn are supported by upright rods 157 and 158. Helical compression springs 159 and 160 encircle the rods 157 and 158, respectively, and support the gutter frame resiliently by bearing on the upper sides of frame members 161 and 162, as shown in FIGURE 13. The plow-supporting pivot 144 also is supported from shafts 155 and 156 through a supporting bar 163 supported by arms 164 and 165 projecting upward from such shafts.

To enable the gutter disks 150 to engage the entrails in the belly cavity of the fish rather than the neck projection at the cut end of the fish, a depressor 166, seen in FIGURES 25 and 26, is located between the gutter disks to control and press such neck projection down out of the way of the gutter disks. This depressor, having an inclined and slightly curved lower edge, is formed as the end of a bar 167 which in turn is carried by a rod 168 extending through holes in lugs 169 so that it can move lengthwise through such holes. A helical compression spring 170 encircles the rod 168 and has one end bearing against the lug farther from the depressor 166 and its other end bearing against a collar 171 secured to the rod. Such spring, therefore, urges the rod 168 and bar 167 lengthwise forward and downward until it is pressed backward by engagement of the end of the depressor 166 with the entrails in the fish cavity.

The lower portions of the outer sides of the gutter disks are shielded from contact with the sides of the fish cavity by cover plates 172 carried by collars 173 encircling the shafts 151. Such cover plates are stiffened by radiating ribs 174 tapering from the collar to the circumferential edge of the cover plate. On the bottom portion of each cover plate is an inturned flange 175 which covers the circumferential teeth around the lower portions of the gutter disks so that the weight of the gutter disk mechanism will be supported by such flanges instead of the teeth being pressed into the flesh of the fish to mutilate it. The circumferential teeth of the gutter disks are therefore exposed to sever the entrails from the belly cavity of the fish only at the feed side of the gutter disks. Such cover plates 172, toothed gutter disks 150, depressor 166 and runner flanges 175 are shown in relation to the body cavity of the fish in FIGURE 27.

FIGURES 22, 24 and 27, in particular, show that the planes of the gutter disks converge downwardly so that the bottom portions of such disks will have a scooping action to remove the entrails of the fish. The degree of tilt of such disks can be adjusted to move their lower edges closer together or farther apart, as may be preferred, for them to perform the most effective eviscerating action. The degree of tilt of the disks is altered by swinging the disk-supporting shafts 151 about the axes of drive shafts 152, respectively, as shown in FIGURE 24.

The gutter frame 154 provides housings for the gutter disk drive shafts 152. A flange 176 on the end of such shaft housing nearer the gutter disks matches a flange 177 carried by a yoke 178 that supports the cross shaft 151 on which the gutter disk 150 and cover plate flange 176 are supported directly. Flange 176 has tapped holes in it, into which cap bolts 179 can be screwed after passing through arcuate slots in flange 177. By loosening such cap bolts the yoke 178 can be tilted in one direction or the other about the axis of shaft 152, which in turn will effect corresponding tilting of the shaft 151 and gutter disk 150. When the desired position of adjustment has been established the cap bolts 179 can be tightened to hold the yoke 178 in such adjusted position.

Because considerable force is exerted on the gutter disks 150 in the eviscerating operation, it is desirable to provide a more positive locking arrangement for holding such disks in tilted position than is possible by the cap bolts 179 bearing against the flange 177. Locking arcs 180 and 181 are curved concentrically with the axis of gutter disk drive shaft 152. Arc 180 is mounted on a rod 182 forming part of the gutter frame and has in it arcuate slots through which cap bolts can project to be screwed into tapped apertures in arc 181. Arc 181 is integral with, or rigidly mounted on, a cover plate 172.

As the yoke 178 is tilted about the center line of shaft 152, therefore, the locking arc 181 will be shifted circumferentially relative to arc 180. When the desired tilting adjustment of shafts 151 has been established such adjustment can be fixed by tightening cap bolts 179 against flange 177 and the cap bolts passing through arc 180.

As the fish F continues to move toward the gutter disks beyond the position shown in FIGURE 26 in the direction indicated by the arrow, the inturned cover plate flanges 175 will serve as a pilot shoe engaging the fish cavity to raise the gutter disks gradually upward in such cavity such as to the position of FIGURE 27. In many instances the engagement of the gutter disks with the entrails of the fish, in the manner indicated in FIGURE 27, will be sufficient to strip the entrails completely from the belly cavity of the fish. In some instances, however, the end of an elongated gut portion may remain attached to the wall of the belly cavity after such cavity has passed beyond the gutter disks.

To strip from the belly cavity of the fish any hanging entrail element, a final gut stripper is provided, which is shown particularly in FIGURES 13, 24, 25, 26, 28 and 29.

The final gut stripper includes a bar 183 swingably supported by a pivot 184 as seen best in FIGURE 28. From the sleeve 185 of the gut stripper fitting around such pivot, a short arm 186 projects toward the feed end of the machine's cleaning section so that such arm and the body bar of the gut stripper constitute a bell crank. A rod 187 is connected to the end portion of arm 186 by a pivot 188. Such rod extends upward through a bracket 189 carried by the gutter frame. A helical compression spring 190 encircling the rod 187 has its lower end engaged with bracket 189 and its upper end engaged with an enlargement 191 on the upper end of the rod.

The lower end of the gut stripper body bar 183 carries a fork 192 having downwardly projecting bifurcations, each of which has in it a groove 193 extending transversely of the length of the bifurcation and facing toward the feed end of the machine's cleaning section. Pressure of the fish against the gut stripper will tend to swing it in the direction indicated by the arrow in FIGURE 29. Such swinging about pivot 184 will swing arm 186 downward and draw rod 187 downward correspondingly. Such downward movement of the rod will cause the head 191 to compress spring 190 so that when the pressure against the gut stripper is removed such spring will return it to the upright position shown in FIGURE 25.

Clearing of the entrails from the cavity of the fish can be assisted by water-jets and after the entrails have been removed from the cavity such water-jets can cleanse the side walls of the cavity. Consequently, as shown in FIGURE 13, several water-flushing pipes can be provided to project streams of water into the belly cavity of the fish as it is moved by the feed means past the plow 142, the gutter disks 150 and the final gut stripper 183. Such streams of water can be ejected from pipes 194, 195, 196 and 197, the flow through which can be controlled, as desired, by valves 198, 199, 200 and 201, respectively. The pipes may be provided with more or less restricted nozzles, depending upon the force with which it is desired to eject the water.

It has been found that tuna fish vary in size principally in the length of the body portion. The girth of the fish and the length of the head do not vary much in fish of different weight. Tun a fiish to be beheaded and cleaned in the machine of the present invention can be delivered to the feed table 11, shown in FIGURE 3, by any suitable means. Such fish will be arranged, by an operator, lying on their sides with their backs forward. The operator can feed such fish successively to the machine simply by shoving each fish back first transversely of its length down the discharge incline from the feed table into a cradle 13, 14, 15 of the beheading section of the machine. Such cradles move out from under the feed table toward the left, as indicated by the arrow in FIGURE 4.

Each fish will be placed in a cradle, as shown in FIGURES 3, 4 and 5, and the operator should be careful to spot the fish so that the tailward edge of the gill is in registry with the index bar 16. The cradle will transport the fish to the beheading station at which the points 19 of the beheading knife will impale the neck portion of the fish as the knife rotates in synchronism with movement of the cradles along the beheading section. During such beheading operation such impaling points will arrest the movement of the head portion of the fish in the cradle momentarily. Such dwell of the head portion of the fish does not interfere with continued movement of the cradle supporting it because the ventral portion 15 of the anterior section of the cradle will tilt, as shown in FIGURES 4 and 9, as the cradle continues its movement. As soon as the knife completes its passage through the fish, engagement of the roller 38 with the cam member 41 will snap the tilted cradle section back into its position adjacent to the section 14. Such movement will straighten the fish from its slightly skewed position in the cradle caused by the dwell of its head portion during passage of the knife through the fish.

From the beheading station the cradle 13, 14, 15 will transport the beheaded fish to the transfer section of the machine at which it will be fed neck first into the cleaning section of the machine, either by an operator at such transfer station or by the tail-engaging channels 71 and 72 shoving the fish along the discharge trough 12. At the cleaning machine end of the chain 58 the forward portion of the fish will have been pushed sufficiently far so as to be clamped between the plates 78 of the cleaning section feed means, and the fish-engaging channels 72 and 71 will be withdrawn downward off the fish by the chain passing around the sprocket 59. While a single tapered fish-pushing channel 71 or 72 might be sufficiently effective to move the fish in this fashion, a better grip on the fish is obtained by the use of two cooperating channels. It is not practical for a single channel to be very long because a long channel would be difficult to turn around a sprocket 59.

During its movement through the cleaning machine, the upper portion of the fish is first confined by the shell 91 so that it will be held firmly while it is fed to the slitter saw 90 for the belly to be slit open. As shown in FIGURE 22, the plow 142 spreads the opposite sides of the slit formed by the saw so as to facilitate entrance of the gutter disks into the belly cavity. During movement of the fish into engagement with the gutter disks, the depressor 166 will hold the entrails firmly to be embraced by the gutter disks sliding along the sides of the cavity and severing the connection of the entrails to the cavity. Finally, any portion of the entrails which has not been severed completely from the belly cavity by the gutter disks will be hooked by the gut stripper 183 and pulled from the cavity.

During the cleaning operation streams of water projected into the belly cavity and onto the cleaning components of the machine will flush out such cavity and wash debris from the machine components. The removed entrails can be collected beneath the cleaning section of the machine by any suitable mechanism, and the beheaded and cleaned fish discharged from the cleaning section of the machine can be removed for further processing by any suitable arrangement.

I claim as my invention:

1. In fish-cleaning mechanism, fish-cleaning means including a pair of gutter disks having toothed peripheries and disposed in adjacent downwardly convergent relationship with the lower portions of their peripheries spaced apart a smaller distance than the upper portions of their peripheries, transport means for carrying a fish beneath such fish-cleaning means, and supporting means for said fish-cleaning means movable elevationally to alter the elevation of said gutter disks relative to said transport means.

2. A fish-cleaning machine comprising eviscerating means for removing the entrails from a slit fish belly, individual fish-clamping plates engageable, respectively, with opposite sides of a fish, supporting means for said fish-clamping plates, spring means interposed between said supporting means and said fish-clamping plates urging opposite fish-clamping plates toward each other, and transport means operable to move said fish-clamping plate supporting means bodily to move opposite fish-clamping plates toward each other and to move said fish-clamping plates conjointly past said eviscerating means, said eviscerating means including a pair of gutter disks, a depressor member disposed between said gutter disks and engageable with entrails of the fish and a bifurcated gut stripper located at the side of said gutter disks remote from the slitter means for pulling entrails from the fish belly cavity.

3. In a fiish-cleaning mechanism, a pair of spaced gutter disks movable into the belly cavity of a fish, a depressor located between said gutter disks for engaging the entrails of a fish, and supporting means supporting said depressor for elevational movement relative to said gutter disks and for resilient movement generally lengthwise of a fish into the cavity of which said gutter disks are moved.

4. In the fish-cleaning mechanism defined in claim 3, the supporting means including a rod one end of which carries the depressor and pivot means mounting said rod for swinging to alter the elevation of the depressor.

5. In a fish-cleaning machine, a bifurcated gut stripper fork movable into the belly cavity of a fish for engaging fish entrails and pulling them from such cavity, and mounting means yieldably mounting said stripper fork for movement lengthwise of the fish belly cavity.

6. In a fish-cleaning mechanism, slitter means engageable with a beheaded fish for slitting the belly portion thereof, transport means for moving fish toward said slitter means including individual plates movable transversely of the length of a fish for clamping engagement with its opposite sides, supporting means supporting said slitter means, and fish-holding means carried by said supporting means adjacent to and ahead of said slitter means, overlying said transport means and engageable with the upper portion of a fish carried by said transport means for holding such fish during engagement of said slitter means therewith.

7. A fish-cleaning machine comprising eviscerating means for removing the entrails from a slit fish belly, individual fish-clamping plates engageable, respectively, with opposite sides of a fish, supporting means for said fish-clamping plates, spring means interposed between said supporting means and said fish-clamping plates urging opposite fish-clamping plates toward each other, and transport means operable to move said fish-clamping plate supporting means bodily to move opposite fish-clamping plates toward each other and to move said fish-clamping plates conjointly past said eviscerating means.

8. In the fish-cleaning mechanism as defined in claim 1, cover means for the gutter disks covering at least a portion of the outer sides of such disk.

References Cited

UNITED STATES PATENTS

| | | | |
|---|---|---|---|
| 1,267,850 | 5/1918 | Cooper | 17—3 |
| 2,105,207 | 1/1938 | Ullin | 17—3 |
| 2,210,234 | 8/1940 | Durand | 17—4 |
| 1,459,273 | 6/1923 | Waugh | 17—3 |
| 1,610,833 | 12/1926 | Waugh | 17—3 |
| 1,643,504 | 9/1927 | Lea | 17—3 |
| 2,142,420 | 3/1939 | Sullivan | 17—3 |
| 2,166,939 | 7/1939 | Christiansen | 17—3 |
| 2,589,701 | 3/1952 | Kaplan | 17—3 X |
| 2,683,893 | 7/1954 | Baader | 17—3 |

LUCIE H. LAUDENSLAGER, Primary Examiner

U.S. Cl. X.R.

17—63